United States Patent
Chuang et al.

(10) Patent No.: US 11,286,333 B2
(45) Date of Patent: Mar. 29, 2022

(54) METHOD FOR DEGRADATING THERMOSETTING RESIN, CATALYST COMPOSITION USED THEREIN AND RESIN COMPOSITION OBTAINED THEREBY

(71) Applicant: INDUSTRIAL TECHNOLOGY RESEARCH INSTITUTE, Hsinchu (TW)

(72) Inventors: Kuei-Yi Chuang, Hsinchu (TW); Kuo-Chan Chiou, Tainan (TW); Yen-Chun Liu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 155 days.

(21) Appl. No.: 16/727,285

(22) Filed: Dec. 26, 2019

(65) Prior Publication Data
US 2021/0189057 A1    Jun. 24, 2021

(30) Foreign Application Priority Data
Dec. 23, 2019   (TW) .................................. 108147196

(51) Int. Cl.
*C08G 59/14* (2006.01)
*C08J 11/16* (2006.01)
*B01J 23/08* (2006.01)

(52) U.S. Cl.
CPC .......... *C08G 59/1405* (2013.01); *B01J 23/08* (2013.01); *C08J 11/16* (2013.01); *C08J 2363/00* (2013.01)

(58) Field of Classification Search
USPC .................................................... 521/40, 63
See application file for complete search history.

(56) References Cited

U.S. PATENT DOCUMENTS

| 10,280,534 B2 | 5/2019 | Goh et al. |
| 2017/0283549 A1* | 10/2017 | Steffanut ................ C08G 63/87 |
| 2018/0355142 A1 | 12/2018 | Zhang et al. |
| 2019/0047181 A1 | 2/2019 | Gosau et al. |

FOREIGN PATENT DOCUMENTS

| CN | 1376728 A | 10/2002 |
| CN | 1298774 C | 2/2007 |
| CN | 1974641 A | 6/2007 |
| CN | 102516594 A | 6/2012 |
| CN | 103232615 A | 8/2013 |
| CN | 103415561 A | 11/2013 |
| CN | 104326907 A | 2/2016 |
| CN | 107365429 B | 9/2018 |
| JP | 2003-55498 A | 2/2003 |
| TW | 574269 B | 2/2004 |
| TW | I250180 A | 3/2006 |
| TW | 200624472 A | 7/2006 |
| TW | I284572 B | 8/2007 |

OTHER PUBLICATIONS

Taiwanese Office Action and Search Report for Taiwanese Application No. 108147196, dated Apr. 6, 2021.

* cited by examiner

*Primary Examiner* — Terressa Boykin
(74) *Attorney, Agent, or Firm* — Birch, Stewart, Kolasch & Birch, LLP

(57) ABSTRACT

A degradation method of thermosetting resin is provided. The method includes the following steps, for example, a first resin composition is provided. The resin in the first resin composition includes a carbon-nitrogen bond, an ether bond, an ester bond or a combination thereof. The first resin composition and a catalyst composition are mixed to perform a degradation reaction to form a second resin composition. The catalyst composition includes a transition metal compound and a group IIIA metal compound. The second resin composition includes a resin monomer or an oligomer thereof having functional groups. The functional group includes an amine group, a hydroxyl group, an ester group, an acid group or a combination thereof. A catalyst composition used in the degradation method and a resin composition obtained by the degradation method are also provided.

14 Claims, No Drawings

METHOD FOR DEGRADATING THERMOSETTING RESIN, CATALYST COMPOSITION USED THEREIN AND RESIN COMPOSITION OBTAINED THEREBY

TECHNICAL FIELD

The present disclosure relates to a method for degradating thermosetting resin using a transition metal compound and a group IIIA metal compound as a catalyst.

BACKGROUND

Among components of current electronic products, the largest carbon dioxide emitters are printed circuit boards (PCBs), which emit more than 100,000 kg of $CO_2$/10,000 square meters of PCB. Therefore, how to effectively recycle waste PCB boards to reduce the amount of carbon dioxide emitted is a challenge facing the PCB industry.

At present, the practice of recycling waste PCB boards are crushed, and then the metal is taken out, recycled and reused. However, plastic accounts for 54.5% of the PCB board, and contains insulating resin and fiberglass cloth. Since the resin systems used in PCBs are all thermosetting polymers, they are quite stable in nature, which makes them difficult to be recycled and can be expensive. At present, they are still mainly burned or buried.

SUMMARY

In accordance with one embodiment of the present disclosure, a method for degradating thermosetting resin is provided, including, providing a first resin composition, wherein the resin in the first resin composition includes a carbon-nitrogen bond, an ether bond, an ester bond or a combination thereof; and mixing the first resin composition and a catalyst composition to proceed to a degradation reaction to form a second resin composition, wherein the catalyst composition includes a transition metal compound and a group IIIA metal compound, the second resin composition includes a resin monomer having functional groups or an oligomer thereof, and the functional group includes an amine group, a hydroxyl group, an ester group, an acid group or a combination thereof.

In one embodiment, the first resin composition includes a thermosetting epoxy resin.

In one embodiment, the metal of the transition metal compound includes cobalt, nickel, vanadium, zinc, scandium, titanium, chromium, manganese, iron, copper, or a combination thereof. In one embodiment, the metal of the group IIIA metal compound includes aluminum, gallium, indium, thallium, or a combination thereof. In one embodiment, the weight ratio between the transition metal compound and the group IIIA metal compound is in a range from 50:50 to 90:10.

In one embodiment, the catalyst composition further includes a first solvent and a second solvent. In one embodiment, the first solvent includes alcohols. In one embodiment, the second solvent includes ketone, amide or dimethyl sulfoxide. In one embodiment, the weight ratio between the first solvent and the second solvent is in a range from 50:50 to 90:10.

In one embodiment, the temperature of the degradation reaction is in a range from 180° C. to 200° C. In one embodiment, the period of the degradation reaction is in a range from 3 hours to 7 hours. In one embodiment, the present method for degradating thermosetting resin further includes removing the catalyst composition by performing concentration and re-precipitation processes to obtain the second resin composition after the degradation reaction.

In accordance with one embodiment of the present disclosure, a catalyst composition used in degradation of thermosetting resin is provided, including, a transition metal compound; a group IIIA metal compound, wherein the weight ratio between the transition metal compound and the group IIIA metal compound is in a range from 50:50 to 90.10; a first solvent, and a second solvent.

In one embodiment, the metal of the transition metal compound includes cobalt, nickel, vanadium, zinc, scandium, titanium, chromium, manganese, iron, copper, or a combination thereof. In one embodiment, the metal of the group IIIA metal compound includes aluminum, gallium, indium, thallium, or a combination thereof. In one embodiment, the first solvent includes alcohols. In one embodiment, the second solvent includes ketone, amide or dimethyl sulfoxide. In one embodiment, the weight ratio between the first solvent and the second solvent is in a range from 50:50 to 90:10.

In accordance with one embodiment of the present disclosure, a resin composition obtained by degradation of thermosetting resin is provided, including, at least one of a first resin, a second resin and a third resin, wherein the first resin includes a monomer having formula (I) or an oligomer thereof, the second resin includes a monomer having formula (D) or an oligomer thereof, and the third resin includes a monomer having formula (III) or an oligomer thereof:

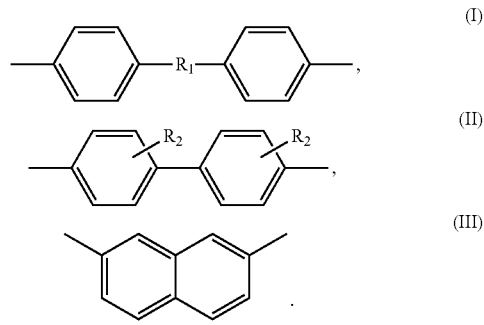

In formula (I), (II) and (III), $R_1$ includes C1-C3 alkylene, carbonyl, ester, sulfur or oxygen, and $R_2$ independently includes C1-C3 alkyl, amine, hydroxyl, ester, acid or hydrogen, wherein the resin composition has a weight-average molecular weight from 500 to 5,000, a polydispersity index (PDI) from 1 to 1.5, and an equivalent number of functional groups from 60 mgKOH/g to 200 mgKOH/g, wherein the functional group includes an amine group, a hydroxyl group, an ester group, an acid group or a combination thereof.

A detailed description is given in the following embodiments.

DETAILED DESCRIPTION

In order to improve the degradation efficiency of thermosetting resins, the present disclosure provides a novel method for degradating thermosetting resins. A dual catalyst system composed of a transition metal compound and a group IIIA metal compound is used with a specific type of polar solvent to proceed to a degradation reaction to effectively control the obtained resin composition after degradation to have an improved polymer dispersity index (PDI), which is convenient for subsequent recycling and reuse.

In accordance with one embodiment of the present disclosure, a method for degradating thermosetting resin is provided, including the following steps. First, a first resin composition is provided. The resin in the first resin composition includes a carbon-nitrogen bond, an ether bond, an ester bond or a combination thereof. Next, the first resin composition and a catalyst composition are mixed to proceed to a degradation reaction to form a second resin composition by breaking the carbon-nitrogen bond, the ether bond or the ester bond. The catalyst composition includes a transition metal compound and a group IIIA metal compound. The second resin composition includes a resin monomer having functional groups or an oligomer thereof. The functional group includes an amine group, a hydroxyl group, an ester group, an acid group or a combination thereof.

In one embodiment, the first resin composition may include a thermosetting resin such as an epoxy resin.

In one embodiment, the metal of the transition metal compound may include cobalt, nickel, vanadium, zinc, scandium, titanium, chromium, manganese, iron, copper, or a combination thereof. Examples of the transition metal compound include cobalt chloride, nickel chloride, vanadium chloride, zinc chloride, scandium chloride, titanium chloride, chromium chloride, manganese chloride, iron chloride, copper chloride, cobalt nitrate, nickel nitrate, vanadium nitrate, zinc nitrate, scandium nitrate, titanium nitrate, chromium nitrate, manganese nitrate, iron nitrate, copper nitrate, or a combination thereof, but the present disclosure is not limited thereto. In one embodiment, the metal of the group IIIA metal compound may include aluminum, gallium, indium, thallium, or a combination thereof. The group IIIA metal compound may be exemplified by aluminum chloride, gallium chloride, indium chloride, thallium chloride, aluminum nitrate, gallium nitrate, indium nitrate, thallium nitrate, or a combination thereof, but the present disclosure is not limited thereto. In one embodiment, the weight ratio between the transition metal compound and the group IIIA metal compound is in a range from about 50:50 to about 90.10. In one embodiment, the weight ratio between the transition metal compound and the group IIIA metal compound is in a range from about 70:30 to about 80:20. If the weight ratio between the transition metal compound and the group IIIA metal compound exceeds the above ratios, the distribution of the molecular weight will be uneven (PDI>1.5).

In one embodiment, the catalyst composition further includes a first solvent and a second solvent. In one embodiment, the first solvent may include alcohols such as methanol, ethanol, propanol or butanol, but the present disclosure is not limited thereto. In one embodiment, the second solvent may include ketone, amide or dimethyl sulfoxide (DMSO), for example, methyl ethyl ketone (MEK), dimethylacetamide (DMAc), or N-methylpyrrolidone (NMP), but the present disclosure is not limited thereto, any polar solvent that is compatible with alcohols is suitable. In one embodiment, the weight ratio between the first solvent and the second solvent is in a range from about 50:50 to about 90:10. In one embodiment, the weight ratio between the first solvent and the second solvent is in a range from about 50:50 to about 70:30. If the weight ratio between the first solvent and the second solvent exceeds the above ratios, there will be a problem with the solubility of the catalyst (i.e. catalyst insoluble will result in poor degradation efficiency).

In one embodiment, the temperature of the degradation reaction is in a range from about 180° C. to about 200° C.

In one embodiment, the period of the degradation reaction is in a range from about 3 hours to about 7 hours. In one embodiment, the present method for degradating thermosetting resin further includes removing the catalyst composition by performing concentration and re-precipitation processes to obtain the second resin composition after the degradation reaction.

In accordance with one embodiment of the present disclosure, a catalyst composition used in degradation of thermosetting resin is provided, including, a transition metal compound, a group IIIA metal compound, a first solvent, and a second solvent. The weight ratio between the transition metal compound and the group IIIA metal compound is in a range from 50:50 to 90:10, for example, 50:50, 60:40, 70:30, 80:20 or 90:10.

In one embodiment, the metal of the transition metal compound may include cobalt, nickel, vanadium, zinc, scandium, titanium, chromium, manganese, iron, copper, or a combination thereof. Examples of the transition metal compound include cobalt chloride, nickel chloride, vanadium chloride, zinc chloride, scandium chloride, titanium chloride, chromium chloride, manganese chloride, iron chloride, copper chloride, cobalt nitrate, nickel nitrate, vanadium nitrate, zinc nitrate, scandium nitrate, titanium nitrate, chromium nitrate, manganese nitrate, iron nitrate, copper nitrate, or a combination thereof, but the present disclosure is not limited thereto. In one embodiment, the metal of the group IIIA metal compound may include aluminum, gallium, indium, thallium, or a combination thereof. The group IIIA metal compound may be exemplified by aluminum chloride, gallium chloride, indium chloride, thallium chloride, aluminum nitrate, gallium nitrate, indium nitrate, thallium nitrate, or a combination thereof, but the present disclosure is not limited thereto. In one embodiment, the first solvent may include alcohols such as methanol, ethanol, propanol or butanol, but the present disclosure is not limited thereto. In one embodiment, the second solvent may include ketone, amide or dimethyl sulfoxide (DMSO), for example, methyl ethyl ketone (MEK), dimethylacetamide (DMAc), or N-methylpyrrolidone (NMP), but the present disclosure is not limited thereto, any polar solvent that is compatible with alcohols is suitable. In one embodiment, the weight ratio between the first solvent and the second solvent is in a range from about 50:50 to about 90.10, for example, 50:50, 60:40, 70:30, 80:20 or 90:10.

In accordance with one embodiment of the present disclosure, a resin composition obtained by degradation of thermosetting resin is provided, including, at least one of a first resin, a second resin and a third resin. The first resin includes a monomer having formula (I) or an oligomer thereof. The second resin includes a monomer having formula (II) or an oligomer thereof. The third resin includes a monomer having formula (III) or an oligomer thereof.

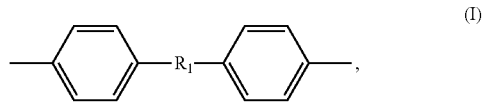

(I)

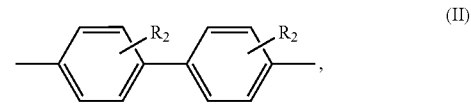

(II)

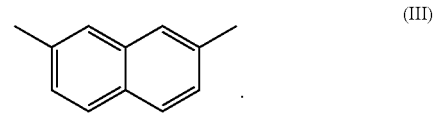

(III)

In formula (I), (II) and (III), $R_1$ includes C1-C3 alkylene, carbonyl, ester, sulfur or oxygen, and $R_2$ independently includes C1-C3 alkyl, amine, hydroxyl, ester, acid or hydrogen. The weight-average molecular weight (Mw) of the resin composition is in a range from 500 to 5,000. The polydispersity index (PDI) is in a range from 1 to 1.5. The equivalent number of functional groups is in a range from 60 mgKOH/g to 200 mgKOH/g. The functional group includes an amine group, a hydroxyl group, an ester group, an acid group or a combination thereof.

The present disclosure provides a novel method for degradating thermosetting resins. Under specific reaction conditions (that is, a specific dual-catalyst and dual-solvent system), the cured thermosetting resin will proceed to a degradation reaction, which is dissolved in the reaction solvent. After being purified, the resin can be recycled successfully. The present degraded resin has specific functional groups, such as an amine group, a hydroxyl group, an ester group, or an acid group, and the equivalent number of functional groups can reach 60 mgKOH/g to 200 mgKOH/g. The weight average molecular weight (Mw) of the recycled resin ranges from 500 to 5,000, and its polydispersity index (PDI) ranges from 1 to 1.5. The above characteristics furnish the degraded resin with high applicability. The low-temperature degradation technology for thermosetting resins of the present disclosure can be used to recover insulating resin in waste circuit boards, and the recovered resin can be used as a hardener, especially as a hardener for epoxy resins, due to its specific molecular weight range and its functional groups, which in turn increasing recycling benefits.

Preparation Example 1

Preparation of the Composite Material with Thermosetting Resin and Glass Fiber (1)

First, 70 g of epoxy resin 828

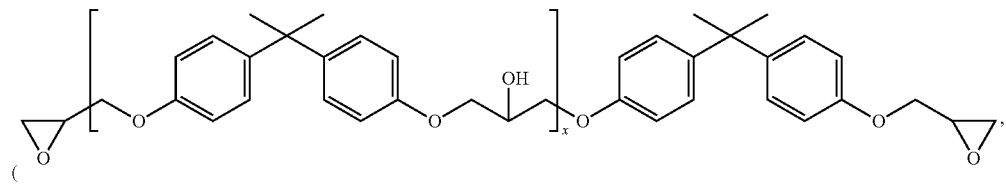

(purchased from Changchun Company), 30 g of epoxy resin HP-4032D

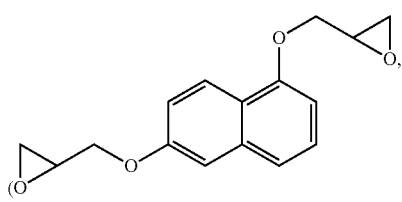

purchased from Japanese pharmaceutical manufacturer DIC) and 55 g of a hardener TD-2090 (phenolic, purchased from Japanese pharmaceutical manufacturer DIC) were mixed in 103 g of methyl ethyl ketone (MEK) to prepare a varnish. Next, a fiberglass cloth (2116, purchased from BAOTEK INC.) was impregnated in the varnish. After pre-baking (171° C. 3 minutes), a prepreg was formed. Next, 8 pieces of prepregs and two pieces of copper foils were pressed (the temperature was 170-200° C. 3 hours), and the composite material with thermosetting resin and glass fiber of this preparation example was obtained. The formula of the thermosetting-resin varnish is shown in Table 1 below.

Preparation Example 2

Preparation of the Composite Material with Thermosetting Resin and Glass Fiber (2)

First, 70 g of epoxy resin 828 (purchased from Changchun Company), 30 g of epoxy resin HP-4032D (purchased from Japanese pharmaceutical manufacturer DIC) and 54 g of a hardener BAPP-m (amine,

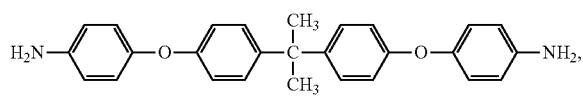

purchased from TCI chemical co., Ltd.) were mixed in 103 g of methyl ethyl ketone (MEK) to prepare a varnish. Next, a fiberglass cloth (2116) was impregnated in the varnish. After pre-baking (171° C. 3 minutes), a prepreg was formed. Next, 8 pieces of prepregs and two pieces of copper foils were pressed (the temperature was 170-200° C. 3 hours), and the composite material with thermosetting resin and glass fiber of this preparation example was obtained. The formula of the thermosetting-resin varnish is shown in Table 1 below.

Preparation Example 3

Preparation of the Composite Material with Thermosetting Resin and Glass Fiber (3)

First, 70 g of epoxy resin 828 (purchased from Changchun Company), 30 g of epoxy resin HP-4032D (purchased from Japanese pharmaceutical manufacturer DIC) and 44 g of a hardener MHHPA (acid,

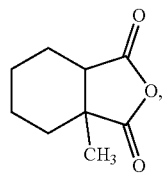

purchased from ECHO CHEMICAL CO., LTD.) were mixed in 96 g of methyl ethyl ketone (MEK) to prepare a varnish. Next, a fiberglass cloth (2116) was impregnated in the varnish. After pre-baking (171° C. 3 minutes), a prepreg was formed. Next, 8 pieces of prepregs and two pieces of copper foils were pressed (the temperature was 170-200° C. 3 hours), and the composite material with thermosetting resin and glass fiber of this preparation example was obtained. The formula of the thermosetting-resin varnish is shown in Table 1 below.

Preparation Example 4

Preparation of the Composite Material with Thermosetting Resin and Glass Fiber (4)

First, 70 g of epoxy resin 828 (purchased from Changchun Company), 30 g of epoxy resin HP-4032D (purchased from Japanese pharmaceutical manufacturer DIC) and 189 g of a hardener HP-8000-65T (ester,

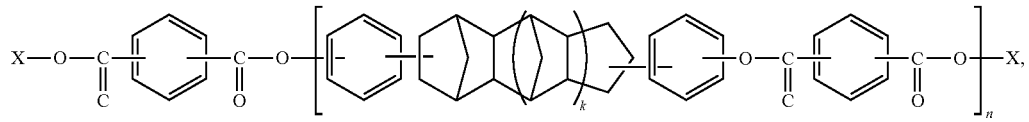

purchased from Japanese pharmaceutical manufacturer DIC) were mixed in 82 g of methyl ethyl ketone (MEK) to prepare a varnish. Next, a fiberglass cloth (2116) was impregnated in the varnish. After pre-baking (171° C. 3 minutes), a prepreg was formed. Next, 8 pieces of prepregs and two pieces of copper foils were pressed (the temperature was 170-200° C. 3 hours), and the composite material with thermosetting resin and glass fiber of this preparation example was obtained. The formula of the thermosetting-resin varnish is shown in Table 1 below.

Preparation Example 5

Preparation of the Composite Material with Thermosetting Resin and Glass Fiber (5)

First, 70 g of epoxy resin 828 (purchased from Changchun Company), 30 g of epoxy resin HP-4032D (purchased from Japanese pharmaceutical manufacturer DIC), 30 g of a hardener TD-2090 (phenolic, purchased from Japanese pharmaceutical manufacturer DIC) and 30 g of a hardener BAPP-m (amine, purchased from TCI chemical co., Ltd.) were mixed in 106 g of methyl ethyl ketone (MEK) to prepare a varnish. Next, a fiberglass cloth (2116) was impregnated in the varnish. After pre-baking (171° C. 3 minutes), a prepreg was formed. Next, 8 pieces of prepregs and two pieces of copper foils were pressed (the temperature was 170-200° C. 3 hours), and the composite material with thermosetting resin and glass fiber of this preparation example was obtained. The formula of the thermosetting-resin varnish is shown in Table 1 below.

TABLE 1

|  |  | Preparation Example 1 | Preparation Example 2 | Preparation Example 3 | Preparation Example 4 | Preparation Example 5 |
|---|---|---|---|---|---|---|
| Epoxy | 828 | 70 g | 70 g | 70 g | 70 g | 70 g |
|  | HP-4032D | 30 g | 30 g | 30 g | 30 g | 30 g |
| Hardener | TD-2090 (phenolic) | 55 g | 0 | 0 | 0 | 30 g |
|  | BAPP-m (amine) | 0 | 54 g | 0 | 0 | 30 g |
|  | MHHPA (acid) | 0 | 0 | 44 g | 0 | 0 |
|  | HP-8000-65T (ester) | 0 | 0 | 0 | 189 g | 0 |
| Solvent | MEK | 103 g | 103 g | 96 g | 82 g | 106 g |

Example 1

Degradation Test of Thermosetting Resin (1)

First, the copper foils of the composite material with thermosetting resin and glass fiber prepared in Preparation Example 1 were removed. Next, 30 g of thermosetting resin material was pulverized into a size less than $1*1$ cm$^2$. Next, a degradation solution (containing 24 g of cobalt chloride, 16 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of resin A obtained after degradation are shown in Table 2. The polydispersity index (PDI) was obtained by measuring molecular weight (Mn and Mw) by GPC (Gel Permeation Chromatography Size Exclusion Chromatography), and finally calculating Mw/Mn.

Example 2

Degradation Test of Thermosetting Resin (2)

First, the copper foils of the composite material with thermosetting resin and glass fiber prepared in Preparation Example 2 were removed. Next, 30 g of thermosetting resin material was pulverized into a size less than $1*1$ cm$^2$. Next, a degradation solution (containing 24 g of cobalt chloride, 16 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of resin B obtained after degradation are shown in Table 2.

Example 3

Degradation Test of Thermosetting Resin (3)

First, the copper foils of the composite material with thermosetting resin and glass fiber prepared in Preparation Example 3 were removed. Next, 30 g of thermosetting resin material was pulverized into a size less than 1*1 cm². Next, a degradation solution (containing 24 g of cobalt chloride, 16 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 2.

Example 4

Degradation Test of Thermosetting Resin (4)

First, the copper foils of the composite material with thermosetting resin and glass fiber prepared in Preparation Example 4 were removed. Next, 30 g of thermosetting resin material was pulverized into a size less than 1*1 cm². Next, a degradation solution (containing 24 g of cobalt chloride, 16 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 2.

Example 5

Degradation Test of Thermosetting Resin (5)

First, the copper foils of the composite material with thermosetting resin and glass fiber prepared in Preparation Example 5 were removed. Next, 30 g of thermosetting resin material was pulverized into a size less than 1*1 cm². Next, a degradation solution (containing 24 g of cobalt chloride, 16 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of resin C obtained after degradation are shown in Table 2.

TABLE 2

| | | Example 1 | Example 2 | Example 3 | Example 4 | Example 5 |
|---|---|---|---|---|---|---|
| Thermosetting resin material | Preparation Example 1 | 30 g | — | — | — | — |
| | Preparation Example 2 | — | 30 g | — | — | — |
| | Preparation Example 3 | — | — | 30 g | — | — |
| | Preparation Example 4 | — | — | — | 30 g | — |
| | Preparation Example 5 | — | — | — | — | 30 g |
| Catalyst | cobalt chloride | 24 g | 24 g | 24 g | 24 g | 24 g |
| | aluminum chloride | 16 g | 16 g | 16 g | 10 g | 16 g |
| Solvent | ethanol | 120 g | 120 g | 120 g | 120 g | 120 g |
| | dimethylacetamide | 40 g | 40 g | 40 g | 40 g | 40 g |
| Characteristics of the resin obtained after degradation | | | | | | |
| Equivalent number of functional groups (ingKOH/g) | | 92 | 83 | 102 | 121 | 93 |
| Weight average molecular weight (Mw) | | 852 | 725 | 912 | 1011 | 938 |
| Polydispersity index (PDI) | | 1.2 | 1.1 | 1.2 | 1.3 | 1.1 |

Example 6

Degradation Test of Thermosetting Resin (6)

First, the copper foils of the composite material with thermosetting resin and glass fiber prepared in Preparation Example 5 were removed. Next, 30 g of thermosetting resin material was pulverized into a size less than 1*1 cm². Next, a degradation solution (containing 16 g of aluminum chloride, 24 g of nickel chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 3.

Example 7

Degradation Test of Thermosetting Resin (7)

First, the copper foils of the composite material with thermosetting resin and glass fiber prepared in Preparation Example 5 were removed. Next, 30 g of thermosetting resin material was pulverized into a size less than 1*1 cm². Next, a degradation solution (containing 20 g of cobalt chloride, 20 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 3.

Example 8

Degradation Test of Thermosetting Resin (8)

First, the copper foils of the composite material with thermosetting resin and glass fiber prepared in Preparation Example 5 were removed. Next, 30 g of thermosetting resin material was pulverized into a size less than 1*1 cm². Next, a degradation solution (containing 34 g of cobalt chloride, 6 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 3.

Example 9

Degradation Test of Thermosetting Resin (9)

First, the copper foils of the composite material with thermosetting resin and glass fiber prepared in Preparation Example 5 were removed. Next, 30 g of thermosetting resin material was pulverized into a size less than 1*1 cm². Next, a degradation solution (containing 24 g of cobalt chloride, 16 g of aluminum chloride, 80 g of ethanol, and 80 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 3.

Example 10

Degradation Test of Thermosetting Resin (10)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 24 g of cobalt chloride, 16 g of aluminum chloride, 120 g of ethanol, and 40 g of N-methylpyrrolidone (NMP)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 3.

TABLE 3

|  |  | Example 6 | Example 7 | Example 8 | Example 9 | Example 10 |
|---|---|---|---|---|---|---|
| Thermosetting resin material | Preparation Example 5 | 30 g | 30 g | 30 g | 30 g | 30 g |
| Catalyst | cobalt chloride | — | 20 g | 34 g | 24 g | 24 g |
|  | aluminum chloride | 16 g | 20 g | 6 g | 16 g | 16 g |
|  | nickel chloride | 24 g | — | — | — | — |
| Solvent | ethanol | 120 g | 120 g | 120 g | 80 g | 120 g |
|  | dimethylacetamide | 40 g | 40 g | 40 g | 80 g | — |
|  | N-methylpyrrolidone | — | — | — | — | 40 g |
| Characteristics of the resin obtained after degradation | | | | | | |
| Equivalent number of functional groups (mgKOH/g) | | 98 | 103 | 127 | 97 | 95 |
| Weight average molecular weight (Mw) | | 997 | 873 | 1721 | 963 | 967 |
| Polydispersity index (PDI) | | 1.2 | 1.2 | 1.3 | 1.1 | 1.1 |

From the results in Tables 2 and 3, it can be seen that if more than two catalysts participated in the degradation reaction and the weight ratio between the transition metal compound and the group IIIA metal compound in the catalyst was between 50:50 to 90:10, the distribution of molecular weight of the obtained resin after degradation was even (PDI between 1 and 1.5), and the equivalent number of functional groups reached 60 mgKOH/g to 200 mgKOH/g.

Comparative Example 1

Degradation Test of Thermosetting Resin (Single Catalyst System)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 40 g of cobalt chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of resin D obtained after degradation are shown in Table 4.

Comparative Example 2

Degradation Test of Thermosetting Resin (Single Catalyst System)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 40 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of resin obtained after degradation are shown in Table 4.

Comparative Example 3

Degradation Test of Thermosetting Resin (Adjustment of Catalyst Ratio)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 16 g of cobalt chloride, 24 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 4.

Comparative Example 4

Degradation Test of Thermosetting Resin (Adjustment of Catalyst Ratio)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 6 g of cobalt chloride, 34 g of aluminum chloride, 120 g of ethanol, and 40 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 4.

Comparative Example 5

Degradation Test of Thermosetting Resin (Adjustment of Solvent Ratio)

First, the copper foils of the composite material with thermosetting resin and glass fiber prepared in Preparation Example 5 were removed. Next, 30 g of thermosetting resin material was pulverized into a size less than $1*1$ cm$^2$. Next, a degradation solution (containing 24 g of cobalt chloride, 16 g of aluminum chloride, 20 g of ethanol, and 140 g of dimethylacetamide (DMAc)) was added to proceed to a degradation reaction at a temperature of 190-200° C. for 3-5 hours. The equivalent number of functional groups, the weight average molecular weight, and the polydispersity index (PDI) of the resin obtained after degradation are shown in Table 4.

TABLE 4

|  |  | Com. Example 1 | Com. Example 2 | Com. Example 3 | Com. Example 4 | Com. Example 5 |
|---|---|---|---|---|---|---|
| Thermo-setting resin material | Preparation Example 5 | 30 g | 30 g | 30 g | 30 g | 30 g |
| Catalyst | cobalt chloride | 40 g | — | 16 g | 6 g | 24 g |
|  | aluminum chloride | — | 40 g | 24 g | 34 g | 16 g |
| Solvent | ethanol | 120 g | 120 g | 120 g | 120 g | 20 g |
|  | dimethylacetamide | 40 g | 40 g | 40 g | 40 g | 140 g |
| Characteristics of the resin obtained after degradation | | | | | | |
| Equivalent number of functional groups (mgKOH/g) | | 32 | 23 | 61 | 34 | no degradation |
| Weight average molecular weight (Mw) | | 5790 | 6135 | 4782 | 6935 | no degradation |
| Polydispersity index (PDI) | | 2.5 | 2.7 | 2.2 | 2.3 | no degradation |

From the results in Table 4, it can be seen that the distribution of molecular weight of the resins obtained after degradation in Comparative Examples 1-4 was not uniform (PDI was greater than 1.5), showing both large and small molecular weight distributions, while Comparative Example 5 did not even undergo a degradation reaction.

Test Example 1

Reactivity Test of Resin after Degradation (1)

First, 30 g of resin A after degradation in Example 1, 50 g of epoxy resin 828 (purchased from Changchun Company), 20 g of epoxy resin 4710 (purchased from Japanese pharmaceutical manufacturer DIC) and 50 g of methyl ethyl ketone (MEK) were mixed with stirring to prepare a varnish. The varnish was applied on a copper foil and baked at 171° C. for 3 minutes. Next, another copper foil was provided to cover thereon and pressed (171° C.; 3.5 hours; 400 psi) to make the varnish adhere to the copper foils. The properties of the prepared composite material are shown in Table 5 below.

Test Example 2

Reactivity Test of Resin after Degradation (2)

First, 30 g of resin B after degradation in Example 2, 50 g of epoxy resin 828 (purchased from Changchun Company), 20 g of epoxy resin 4710 (purchased from Japanese pharmaceutical manufacturer DIC) and 50 g of methyl ethyl ketone (MEK) were mixed with stirring to prepare a varnish. The varnish was applied on a copper foil and baked at 171° C. for 3 minutes. Next, another copper foil was provided to cover thereon and pressed (171° C., 3.5 hours; 400 psi) to make the varnish adhere to the copper foils. The properties of the prepared composite material are shown in Table 5 below.

Test Example 3

Reactivity Test of Resin after Degradation (3)

First, 30 g of resin C after degradation in Example 5, 50 g of epoxy resin 828 (purchased from Changchun Company), 20 g of epoxy resin 4710 (purchased from Japanese pharmaceutical manufacturer DIC) and 50 g of methyl ethyl ketone (MEK) were mixed with stirring to prepare a varnish. The varnish was applied on a copper foil and baked at 171° C. for 3 minutes. Next, another copper foil was provided to cover thereon and pressed (171° C.; 3.5 hours; 400 psi) to make the varnish adhere to the copper foils. The properties of the prepared composite material are shown in Table 5 below.

Test Example 4

Reactivity Test of Resin after Degradation (4)

First, 30 g of resin D after degradation in Comparative Example 1, 50 g of epoxy resin 828 (purchased from Changchun Company), 20 g of epoxy resin 4710 (purchased from Japanese pharmaceutical manufacturer DIC) and 50 g of methyl ethyl ketone (MEK) were mixed with stirring. The results are shown in Table 5 below (the resin provided by this comparative example was insoluble and cannot be measured).

TABLE 5

|  |  | Test Example 1 | Test Example 2 | Test Example 3 | Test Example 4 |
|---|---|---|---|---|---|
| Resin after degradation | A (Example 1) | 30 g | | | |
|  | B (Example 2) | | 30 g | | |
|  | C (Example 5) | | | 30 g | |
|  | D (Com. Example 1) | | | | 30 g |
| Epoxy resin | 828 | 50 g | 50 g | 50 g | 50 g |
|  | 4710 | 20 g | 20 g | 20 g | 20 g |
| Solvent | methyl ethyl ketone | 50 g | 50 g | 50 g | 50 g |
| Characteristics | Tg(° C.) | 152 | 157 | 162 | (precipitation) |
|  | peel strength (1 bf/in) | 6.2 | 6.3 | 6.6 | (precipitation) |

From the results in Table 5, it can be seen that by controlling the distribution of the molecular weight of the resins after degradation to a PDI of between 1 and 1.5 and the equivalent number of functional groups to between 60 mgKOH/g and 200 mgKOH/g will facilitate the degraded resin to further react with the epoxy resin and promote the hardening reaction of the epoxy resin.

Test Example 5

Application Test of Resin after Degradation

First, a glass fiber cloth (2116) was impregnated in the varnish prepared in Test Example 1, and baked at 171° C. for 3 minutes to form a prepreg. Six pieces of prepregs were prepared in the above manner. Next, the prepregs were placed between two copper foils and pressed to form a high heat-resistant composite material. After the copper foils were removed by etching, the characteristics were measured and the results are shown in Table 6 below.

TABLE 6

|  | Test Example 5 |
|---|---|
| Glass transition temperature (Tg) | 165° C. |
| Degradation temperature (Td) | 398° C. |
| Thermal expansion coefficient (CTE) | 58 ppm/° C. |

From the results in Table 6, it can be seen that the present resin after degradation can also be successfully applied to high heat-resistant composite materials.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for degradating thermosetting resin, comprising:
providing a first resin composition having a resin, wherein the resin in the first resin composition comprises a carbon-nitrogen bond, an ether bond, an ester bond or a combination thereof; and
mixing the first resin composition and a catalyst composition to proceed to a degradation reaction to form a second resin composition, wherein the catalyst composition comprises a transition metal compound having a metal and a group IIIA metal compound having a metal, the second resin composition comprises a resin monomer having functional groups or an oligomer thereof, and the functional group comprises an amine group, a hydroxyl group, an ester group, an acid group or a combination thereof, wherein the catalyst composition comprises a first solvent and a second solvent, the first solvent comprises alcohols, and the second solvent comprises ketone, amide or dimethyl sulfoxide.

2. The method for degradating thermosetting resin as claimed in claim 1, wherein the first resin composition comprises a thermosetting resin.

3. The method for degradating thermosetting resin as claimed in claim 1, wherein the metal of the transition metal compound comprises cobalt, nickel, vanadium, zinc, scandium, titanium, chromium, manganese, iron, copper, or a combination thereof.

4. The method for degradating thermosetting resin as claimed in claim 1, wherein the metal of the group IIIA metal compound comprises aluminum, gallium, indium, thallium, or a combination thereof.

5. The method for degradating thermosetting resin as claimed in claim 1, wherein the transition metal compound and the group IIIA metal compound have a weight ratio from 50:50 to 90:10.

6. The method for degradating thermosetting resin as claimed in claim 1, wherein the degradation reaction has a temperature from 180° C. to 200° C.

7. The method for degradating thermosetting resin as claimed in claim 1, wherein the degradation reaction has a period from 3 hours to 7 hours.

8. The method for degradating thermosetting resin as claimed in claim 1, further comprising removing the catalyst composition by performing concentration and re-precipitation processes to obtain the second resin composition after the degradation reaction.

9. A catalyst composition used in degradation of thermosetting resin, comprising:
a transition metal compound having a metal;
a group IIIA metal compound having a metal, wherein the transition metal compound and the group IIIA metal compound have a weight ratio from 50:50 to 90:10;
a first solvent, wherein the first solvent comprises alcohols; and
a second solvent, wherein the second solvent comprises ketone, amide or dimethyl sulfoxide.

10. The catalyst composition used in degradation of thermosetting resin as claimed in claim 9, wherein the metal of the transition metal compound comprises cobalt, nickel, vanadium, zinc, scandium, titanium, chromium, manganese, iron, copper, or a combination thereof.

11. The catalyst composition used in degradation of thermosetting resin as claimed in claim 9, wherein the metal of the group IIIA metal compound comprises aluminum, gallium, indium, thallium, or a combination thereof.

12. The catalyst composition used in degradation of thermosetting resin as claimed in claim 9, wherein the first solvent and the second solvent have a weight ratio from 50:50 to 90:10.

13. A resin composition obtained by degradation of thermosetting resin, comprising:
at least one of a first resin, a second resin and a third resin, wherein the first resin comprises a monomer having formula (I) or an oligomer thereof, the second resin comprises a monomer having formula (II) or an oligomer thereof, and the third resin comprises a monomer having formula (III) or an oligomer thereof:

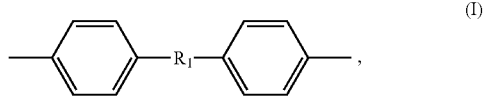

(I)

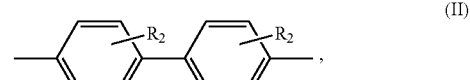

(II)

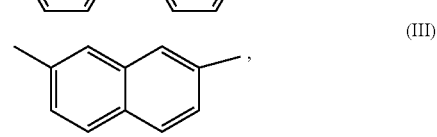

(III)

wherein $R_1$ comprises C1-C3 alkylene, carbonyl, ester, sulfur or oxygen, and $R_2$ independently comprises C1-C3 alkyl, amine, hydroxyl, ester, acid or hydrogen,
wherein the resin composition has a weight-average molecular weight from 500 to 5,000, a polydispersity index (PDI) from 1 to 1.5, and an equivalent number of functional groups from 60 mgKOH/g to 200 mgKOH/g, wherein the functional group comprises an amine group, a hydroxyl group, an ester group, an acid group or a combination thereof.

14. The method for degradating thermosetting resin as claimed in claim 1, wherein the first solvent and the second solvent have a weight ratio from 50:50 to 90:10.

* * * * *